United States Patent
Hamidouche et al.

(10) Patent No.: US 10,936,697 B2
(45) Date of Patent: Mar. 2, 2021

(54) OPTIMIZED AND SCALABLE SPARSE TRIANGULAR LINEAR SYSTEMS ON NETWORKS OF ACCELERATORS

(71) Applicant: Advanced Micro Devices, Inc., Santa Clara, CA (US)

(72) Inventors: Khaled Hamidouche, Austin, TX (US); Michael W. LeBeane, Austin, TX (US); Nicholas P. Malaya, Austin, TX (US); Joseph L. Greathouse, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 282 days.

(21) Appl. No.: 16/044,145

(22) Filed: Jul. 24, 2018

(65) Prior Publication Data
US 2020/0034405 A1    Jan. 30, 2020

(51) Int. Cl.
*G06F 17/16* (2006.01)
*G06F 9/38* (2018.01)
*G06F 9/30* (2018.01)
*G06F 17/12* (2006.01)

(52) U.S. Cl.
CPC ............ *G06F 17/16* (2013.01); *G06F 9/3001* (2013.01); *G06F 9/3838* (2013.01); *G06F 9/3889* (2013.01); *G06F 17/12* (2013.01)

(58) Field of Classification Search
CPC ........ G06F 17/16; G06F 9/3001; G06F 17/12; G06F 9/3838; G06F 9/3889
USPC ......................................................... 708/607
See application file for complete search history.

(56) References Cited

U.S. PATENT DOCUMENTS 10,691,772 B2 * 6/2020 Greathouse ............... G06F 9/48

OTHER PUBLICATIONS

Mayer, Jan. "Parallel algorithms for solving linear systems with sparse triangular matrices." Computing 86.4 (2009): 291.
Totoni, Ehsan, Michael T. Heath, and Laxmikant V. Kale. "Structure-adaptive parallel solution of sparse triangular linear systems." Parallel Computing 40.9 (2014): 454-470.

* cited by examiner

*Primary Examiner* — Tan V Mai
(74) *Attorney, Agent, or Firm* — Liang & Cheng, PC

(57) ABSTRACT

A method includes storing a first portion of a sparse triangular matrix in a local memory and launching a kernel for executing a set of workgroups. The first portion includes a plurality of row blocks, and each workgroup in the set of workgroups is associated with one of the plurality of row blocks. The method also includes, for each workgroup in the set of workgroups, solving the row block. The row block is solved by, for each row segment of a first subset of row segments in the row block, calculating a partial sum for the row segment based on one or more matrix elements in the row segment, and writing the partial sum to a remote memory of a first remote processing unit prior to terminating the kernel.

20 Claims, 10 Drawing Sheets

```
values:   [a, b, c, d, e, f, g, h, i, j]
columns:  [0, 0, 1, 0, 2, 0, 3, 1, 3, 4]
row_ptrs: [0, 1, 3, 5, 7, 10]
```
CSR dataset 321

```
completion: [0, 0, 0, 0, 0]
```
factor completion array 323

FIGURE 4B

OPTIMIZED AND SCALABLE SPARSE TRIANGULAR LINEAR SYSTEMS ON NETWORKS OF ACCELERATORS

BACKGROUND

A triangular matrix is a type of square matrix that has only zero elements above or below the main diagonal of the matrix. A lower triangular matrix has only zero elements above the main diagonal, such that any nonzero elements in the matrix are in the lower triangle, on or below the main diagonal. An upper triangular matrix has only zero elements below the main diagonal, such that any nonzero elements in the matrix are in the upper triangle, on or above the main diagonal. A triangular matrix can be used to represent a system of equations in the field of linear algebra.

A sparse triangular matrix is a triangular matrix that has a substantial number of zero elements in the populated triangle; for example, a sparse lower triangular matrix has one or more zero values in its lower triangle. A sparse triangular solve (SpTS) is process for solving for the vector x in the equation $Ax=y$, where A is a sparse triangular matrix with N rows and N columns, x is a vector with N unknown values, and y is a vector of N known values. If the only non-zero values in the matrix A are on the main diagonal and on one side of that diagonal, it is possible to solve for the vector x using substitution. Solving for a vector entry x[n] relies on having solved all previous vector entries (e.g., x[0]-x[n-1]) in the case of forward substitution in a lower triangular matrix. However, if the matrix is sparse, some of the triangular matrix values are also zero and it is possible to solve multiple rows in parallel, on parallel processors.

BRIEF DESCRIPTION OF THE DRAWINGS

The present disclosure is illustrated by way of example, and not by way of limitation, in the figures of the accompanying drawings.

FIG. 4B illustrates a compressed sparse row (CSR) dataset and a factor completion array, according to an embodiment.

DETAILED DESCRIPTION

Figure 1:
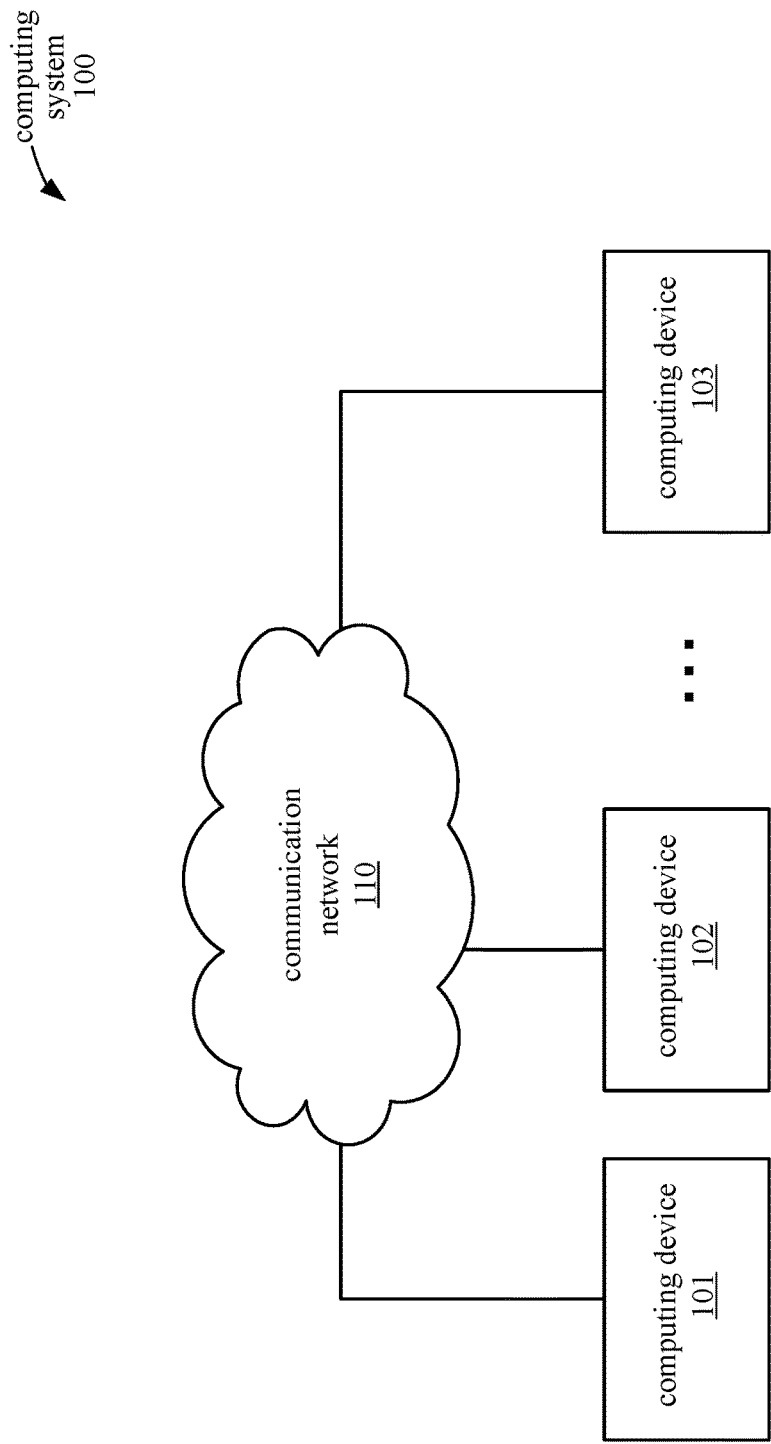
FIG. 1 illustrates an embodiment of a parallel computing system for performing a sparse triangular solve (SpTS), according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A sparse triangular solve (SpTS) attempts to solve for unknown values in the vector x in the equation $Ax=y$, where A is a sparse triangular matrix and where y is a vector of known values. SpTS computations are used to solve Sparse Triangular Linear Systems (STLS) of equations, which arise in many applications such as science and engineering simulations. Solving rows in the sparse triangular matrix in parallel results in a series of data dependencies; the solution of each factor x[n] in the vector x depends on the previous factors x[0]-x[n-1] being solved. The solution of STLS remains inefficient in parallel and distributed machines because of the data dependencies existing between the rows of the sparse triangular matrix.

The solution of a STLS is divisible into a series of levels, where factors in the same level do not depend on each other either directly or transitively and are thus solvable in parallel with each other. However, factors in different levels depend on the solutions of factors in the prior levels before they can be solved, resulting in loss of parallelism. In addition, the communication of solved factors between computing nodes in a distributed system (e.g., when a calculation by one computing node depends on a factor calculated by another node) increases the overhead for solving the STLS. STLS are nevertheless usually solved in parallel, both for memory scalability and because the matrix is often already distributed across processors from a previous computation (e.g., factorization).

Some approaches for solving STLS on distributed accelerator-based (e.g., graphics processing unit (GPU)) systems involve iteratively interleaving network communication with a computation kernel, where the computation kernel is small due to the sparse nature of the matrix and the data dependencies. Each kernel is launched to calculate a factor corresponding to a row of the matrix when all of the dependencies for the row are solved. Communication of the solved factor to other nodes occurs at the end of the kernel; the hardware accelerator (e.g., GPU) returns control to the central processing unit (CPU), and the communication to other computing nodes is handled by the CPU via network communication with two-sided semantics. This approach limits the scalability and efficiency of STLS computations on distributed, accelerator-based systems due to the high overhead resulting from repeated costly kernel launches and latency due to coarse-grained communication.

In one embodiment, an approach for solving STLS using persistent kernels and fine-grained communication of solved factors with one-sided semantics allows for more efficient use of GPU resources by overlapping computation and communication while avoiding costly overheads associated with the starting and stopping of multiple kernels. Each GPU in a distributed parallel computing system launches a single persistent kernel for solving a portion of the sparse triangular matrix. Within these kernels, multiple workgroups each operate on a row block including multiple row segments of the matrix. While some workgroups wait for dependencies to be met (i.e., antecedent row segments to be solved), workgroups without unmet dependencies proceed with solving their respective row blocks. The granularity of the computation is thus determined by the size of the workgroups. Fine grained synchronization and communication is achieved through the use of smaller and more numerous workgroups, rather than by incurring an increase in overhead associated with the starting and stopping of multiple small kernels.

Once a row segment is solved that is a dependency for a row segment being solved in a remote computing node, a partial sum of the terms in the row segment is communicated to the other computing node via a direct remote write operation such as remote direct memory access (RDMA). The communication is initiated by the hardware accelerator (e.g., GPU) rather than the CPU; thus, the persistent kernel is not terminated for control to be returned to the CPU. Accordingly, the latency and computational cost of returning control to the CPU is avoided. Scalability is improved in this approach for performing SpTS computations due to the increased parallelism for computation and communication tasks, and due to avoiding the costs of starting and stopping multiple kernels.

FIG. 1 illustrates an embodiment of a parallel computing system 100 capable of performing a SpTS. Computing system 100 includes multiple computing nodes, implemented using computing devices 101-103 that are connected to each other via a communication network 110. Each of the computing devices 101-103 has processing and memory storage capabilities. In one embodiment, the computing system 100 is contained within a single physical enclosure, and the communication network 110 is a bus or system interconnect connecting the computing devices 101-103 within the enclosure. For example, the computing devices 101-103 can include processing units such as GPUs, central processing units (CPUs), field programmable gate arrays (FPGAs), etc. on the same board or on separate carrier boards that are connected to each other via a backplane. In one embodiment, the components in the computing system 100 are contained in separate physical enclosures and are geographically distributed. For example, the computing devices 101-103 can represent individual servers, personal computers, mobile devices, etc. that are connected to each other via a wide-area network (WAN) such as the Internet, a local-area network (LAN), wireless network, or other communication network 110. In one embodiment, the computing devices 101-103 represent the same type or similar types of devices; alternatively, the computing devices 101-103 are different types of devices.

Figure 2:
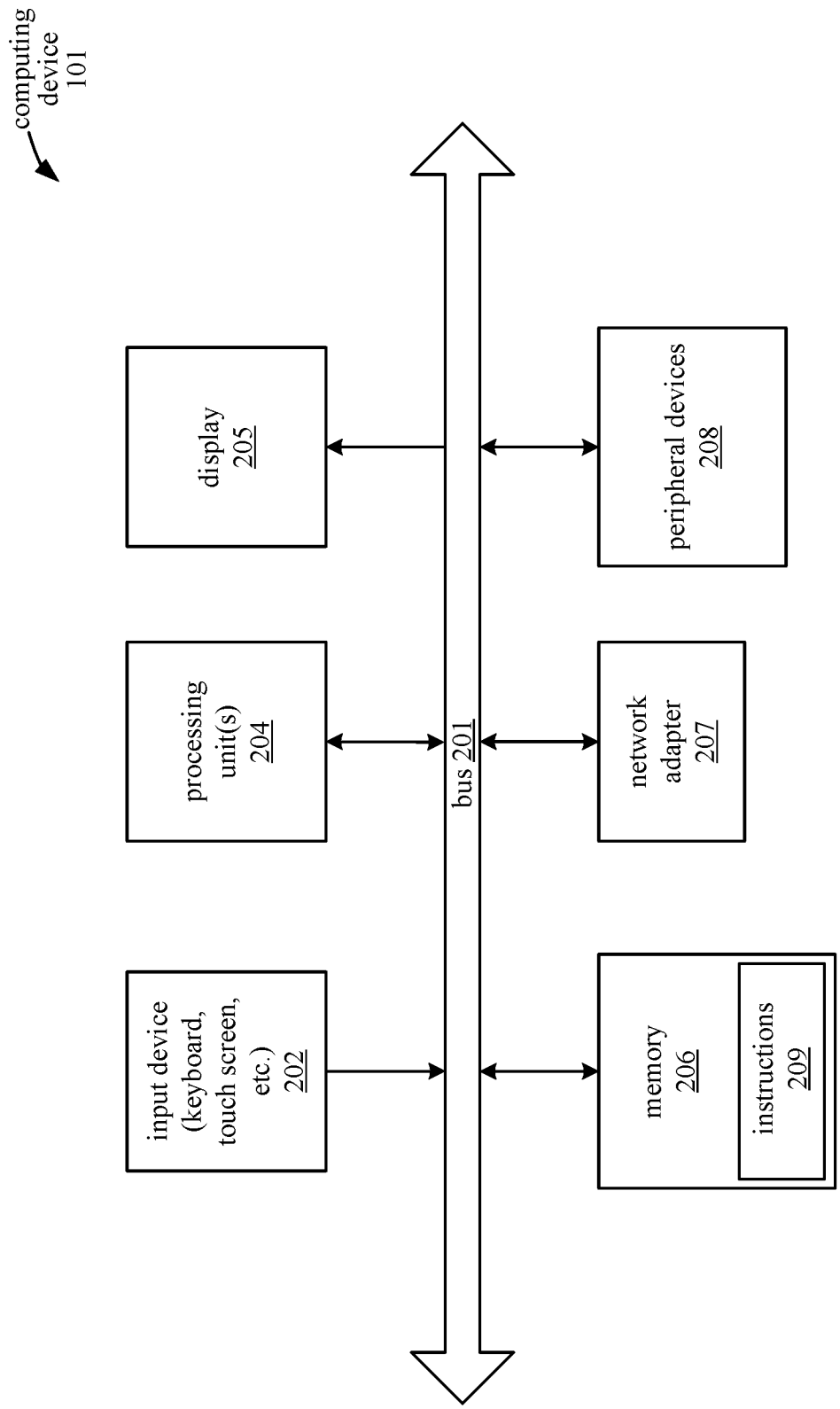
FIG. 2 illustrates a block diagram of a computing device, according to an embodiment.

FIG. 2 illustrates an embodiment of a computing device 101 in which a parallel SpTS mechanism is implemented. In general, the computing device 101 is embodied as any of a number of different types of devices, including but not limited to a laptop or desktop computer, mobile device, server, etc. The computing device 101 includes a number of components 202-208 that communicate with each other through a bus 201. In computing device 101, each of the components 202-208 is capable of communicating with any of the other components 202-208 either directly through the bus 201, or via one or more of the other components 202-208. The components 201-208 in computing device 101 are contained within a single physical enclosure, such as a laptop or desktop chassis, or a mobile phone casing. In alternative embodiments, some of the components of computing device 101 are embodied as peripheral devices such that the entire computing device 101 does not reside within a single physical enclosure.

The computing device 101 also includes user interface devices for receiving information from or providing information to a user. Specifically, the computing device 101 includes an input device 202, such as a keyboard, mouse, touch-screen, or other device for receiving information from the user. The computing device 101 displays information to the user via a display 205, such as a monitor, light-emitting diode (LED) display, liquid crystal display, or other output device.

Computing device 101 additionally includes a network adapter 207 that includes network interface circuitry for transmitting and receiving data over a wired or wireless network. Computing device 101 also includes one or more peripheral devices 208. The peripheral devices 208 may include mass storage devices, location detection devices, sensors, input devices, or other types of devices used by the computing device 101.

Computing device 101 includes one or more processing units 204, which in the case of multiple processing units 204 are capable of operating in parallel. The processing unit(s) 204 are configured to receive and execute instructions 209 that are stored in the memory subsystem 206. In one embodiment, each of the processing unit(s) 204 includes multiple processing cores that reside on a common integrated circuit substrate. Memory subsystem 206 includes memory devices used by the computing device 101, such as random-access memory (RAM) modules, read-only memory (ROM) modules, hard disks, and other non-transitory computer-readable media.

Some embodiments of computing device 101 include fewer or more components than the embodiment as illustrated in FIG. 2. For example, certain embodiments are implemented without any display 205 or input devices 202. Other embodiments have more than one of a particular component; for example, an embodiment of computing device 101 could have multiple buses 201, network adapters 207, memory devices 206, etc.

Figure 3:
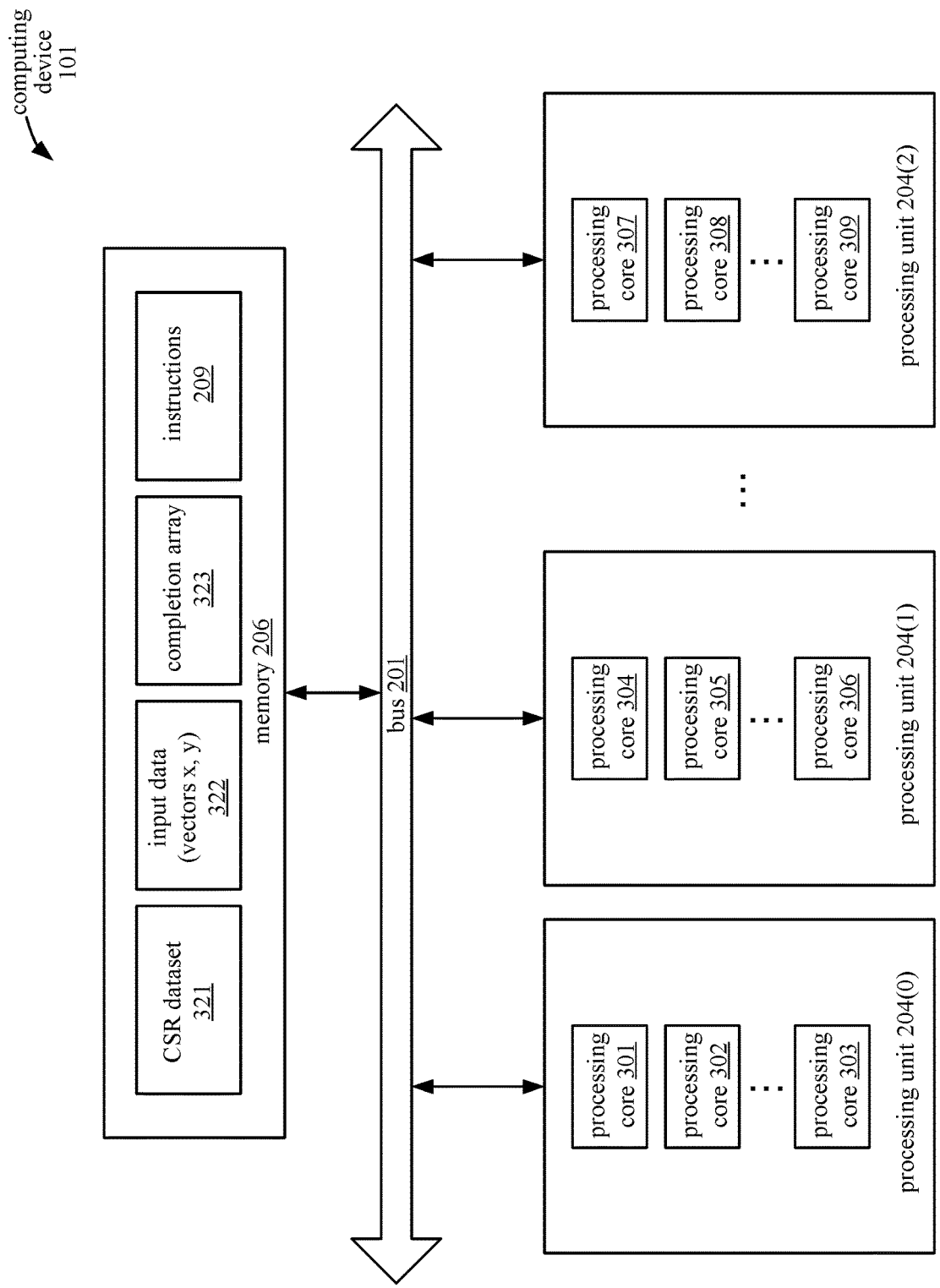
FIG. 3 illustrates multiple processing units and memory in a computing device, according to an embodiment.

FIG. 3 illustrates a block diagram including selected components of the computing device 101, according to an embodiment. FIG. 3 illustrates the processing units 204, which are each connected to the memory 206 via bus 201. While FIG. 3 illustrates one of the computing devices 101, other computing devices (e.g., 102-103) in the computing system 100 include similar components.

In one embodiment, each of the processing units 204 is a GPU, CPU, FPGA, or other processing device, and is located on a separate integrated circuit die from other processing units in the set of processing units 204. Each of the processing units 204 includes a set of processing cores on a single integrated circuit die. Processing unit 204(0) includes processing cores 301-303, processing unit 204(1) includes processing cores 304-306, and processing unit 204(2) includes processing cores 307-309. Each of the processing cores is configured to execute a thread in a computer program, as directed by the instructions 209. The processing cores 301-309 are capable of executing instructions independently from each other, and are thus capable of executing parallel threads in a SpTS process, where each of the parallel threads is executed in one of the processing cores 301-309 and calculates a value for one of the factors in the vector x.

In addition to a set of instructions 209 for performing the high-performance SpTS of the equation Ax=y, the memory 206 also stores the sparse triangular matrix A in the form of a CSR dataset 321 and input data 322, which includes the vector x of unknown factors to be solved and the vector y of known product values. The memory 206 also stores a completion array 323 that includes a completion flag for each of the factors in the vector x, with each completion flag indicating whether its corresponding factor has been solved. In one embodiment, the information in the memory 206 is stored on a single memory device or subsystem in the computing device 101. In alternative embodiments, the information is distributed across multiple memory devices in the same computing device 101 or in multiple computing devices (e.g., 101-103). In one embodiment, a memory system for the broader computing system 100 includes a memory region in each of the multiple computing devices 101-103, and is implemented by different physical memory devices distributed across the computing devices 101-103.

Figure 4A:
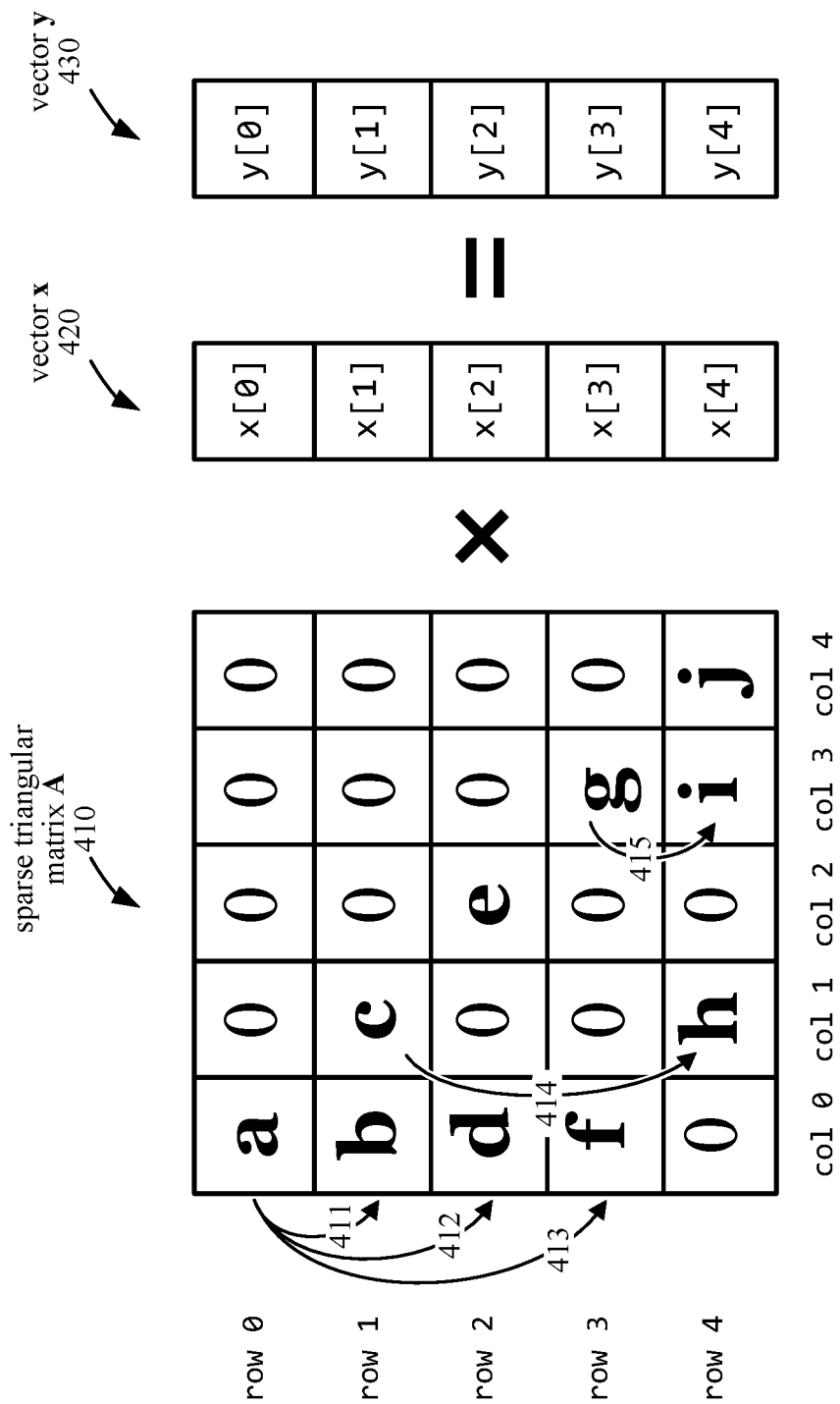
FIG. 4A illustrates a matrix multiplication of a sparse triangular matrix and a vector, according to an embodiment.

FIG. 4A illustrates the multiplication of a sparse triangular matrix 410 with a vector x 420 that results in a product vector y 430 (i.e., Ax=y), according to an embodiment. The matrix A 410 is used as an input for a SpTS, and is a lower triangular matrix that includes 10 non-zero elements. The main diagonal of the matrix A 410 includes the diagonal elements a, c, e, g, and j. Since matrix A 410 is a lower triangular matrix, it can be solved with forward-substitution. This means that some rows will be solved using the results of previously solved higher-up rows as input. Accordingly, the arrows 411-415 represent these dependencies in the forward-substitution process. For example, solving the factors x[1], x[2], and x[3] corresponding to respective rows 1, 2, and 3 depends on the factor x[0] associated with row 0 being solved. These dependencies are indicated by the arrows 411, 412, and 413, respectively. For example, the dependency arrow 411 indicates that calculating the value of the term bx[0] from row 1 depends on solving for x[0] using the term ax[0] in row 0. Dependency arrows 414 and 415 indicate that solving factor x[4] via row 4 depends on solving the x[1] and x[3] factors, respectively, which correspond to the non-zero elements c and g. The solved x[1] and x[3] factors are used to calculate the terms hx[1] and ix[3] when solving for the factor x[4]. While the SpTS mechanism is described herein as being performed for solving a lower triangular matrix, the mechanism can be similarly used to perform backwards-substitution to solve an upper triangular matrix.

FIG. 4B illustrates a Compressed Sparse Row (CSR) dataset 321 that represents the sparse triangular matrix A 410, according to an embodiment. The CSR dataset 321 includes three arrays: a values array (values[ ]), a columns array (columns[ ]), and a row pointers array (row_ptrs[ ]). The values array stores the non-zero elements of the matrix A 410. The elements are stored in order from left to right (column 0 to column 4 within each row) and from top to bottom (row 0 to row 4) in the matrix. The columns array identifies, for each of the elements in the values array, a column of the matrix in which the element is located. The column array has the same number of entries as the values array; each element of the column array identifies the column for a corresponding element in the values array having the same array index. The row pointers array identifies which elements are in each row of the matrix. Specifically, each value in the row pointers array is an index pointing into the values array and the columns array at the first value in each row. The final value in the row pointers array is one more than the highest index in the values array or columns array.

FIG. 4B additionally illustrates a factor completion array 323 that is used to track whether factors have been solved, according to an embodiment. In one embodiment, a waiting dependent thread (e.g., executing in a different core of the same processing unit) checks the factor completion array 323 to determine whether its antecedent factors have been solved. The completion array 323 stores a completion flag for each of the factors in the vector x 420 (and thus for each of the rows in the matrix A 410). Each factor in the vector x 420 corresponds to a flag in the factor completion array 323 having the same index (i.e., x[n] corresponds to completion[n]). Before starting the SpTS, all of the flags in the factor completion array 323 are initialized to '0', indicating that none of the factors have yet been solved. Whenever a solved value for one of the factors is written in the vector x 420, the corresponding completion flag in factor the completion array 323 is also asserted to indicate that the solved value is available for use in subsequent calculations. In one embodiment, the completion flag is deasserted when its value is zero, and is asserted when its value is a non-zero value.

Figure 5A:
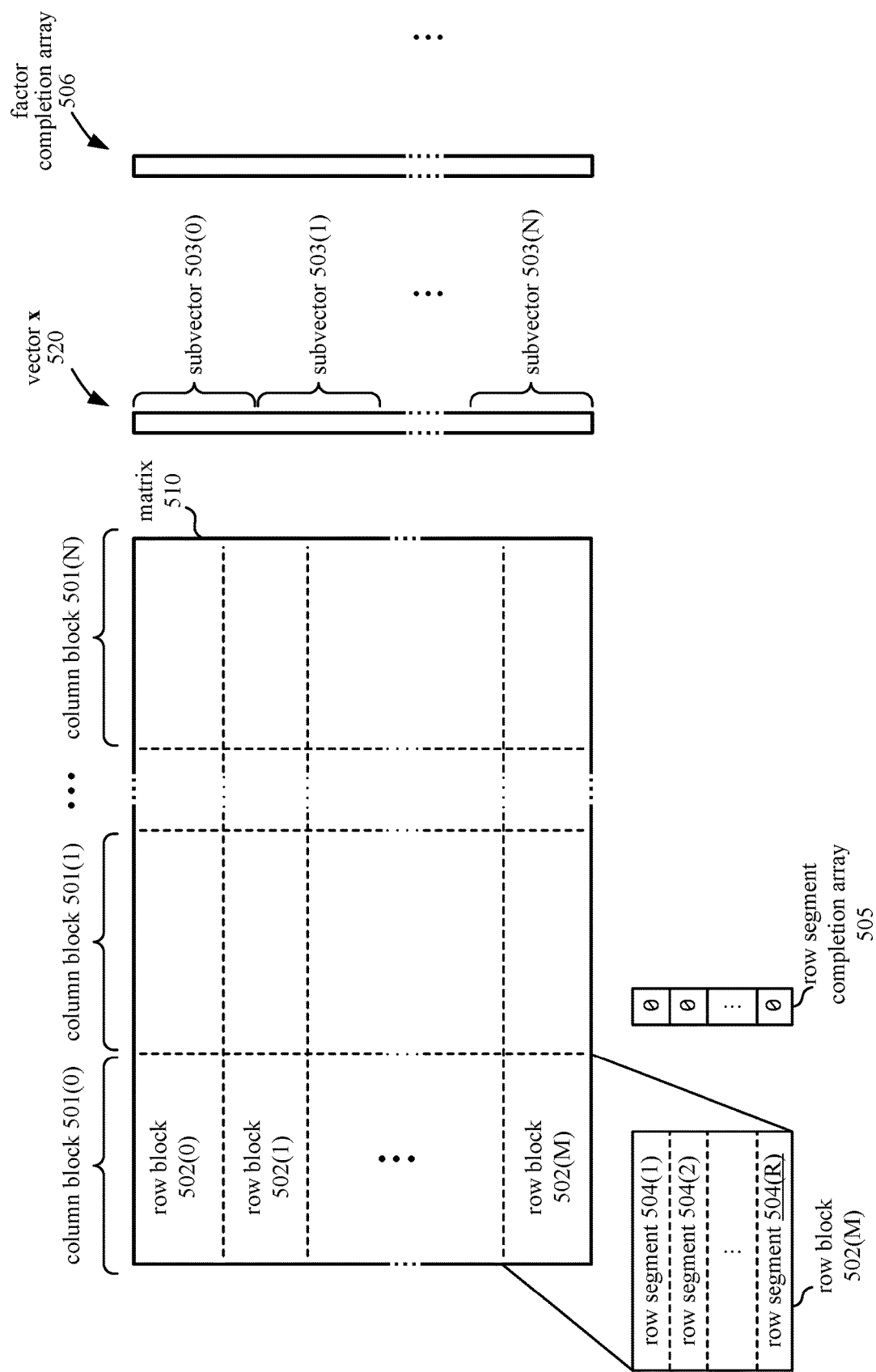
FIG. 5A illustrates the division of a sparse triangular matrix into smaller blocks for solving in a parallel computing system, according to an embodiment.

FIG. 5A illustrates the division of a sparse triangular matrix 510 into smaller blocks for parallel solving in an accelerator-based distributed parallel computing system, according to an embodiment. The matrix 510 is divided into N portions 501(0)-501(N), where each of the portions 501 is a column block that includes a subset of the columns of matrix 510. That is, each of the column blocks 501 includes elements in the subset of columns included in the column block. Each of the column blocks 501 does not include any columns in common with any other of the column blocks 501. A factor vector x 520 for the matrix 510 includes factors each corresponding to one of the columns of the matrix 510 in a multiplication of the matrix with the vector x 520. Accordingly, the factor vector x 520 is also divided into N subvectors 503(0)-503(N), where each of the N subvectors 503 corresponds to a respective one of the column blocks 501. Each of the N subvectors 503 includes a subset of the factors in the vector x 520. The column blocks 501 are each assigned to different computing nodes for solving, with subvectors 503 assigned for solving in the same computing nodes as their respective corresponding column blocks 501. A factor completion array 506 includes a factor completion flag for each of the rows in the matrix 510 and corresponding factors in vector x 520. When asserted, each factor completion flag in the factor completion array 506 indicates that the factor for an associated row has been solved. In one embodiment, a computing node stores a portion of the factor completion array 506 that includes the factor completion flags for its assigned subvector 503. The factor completion flags are thus accessible to the computing node for determining when factors have been solved and are available for use in solving its assigned row segments.

Within each of the column blocks 501, the matrix elements are also divided into M row block portions (e.g., 502(0)-502(M)), where each of the row blocks includes elements within the column block that are in a subset of the rows of matrix 510. Each row segment represents a portion of a row of the matrix 510 that is within the column block. For example, row block 502(M) includes R row segments 504(1)-504(R), where each row segment 504 includes elements from one row of the matrix 510 that are also in the column block 501(0). In one embodiment, each of the row blocks 502 includes the same number of contiguous row segments, and does not include any row segments in common with other row blocks 502. Each of the row segments 504 is associated with a row segment completion flag in a row segment completion array 505. Each of the row segment completion flags indicates whether its corresponding row segment has been solved. In one embodiment, the row segment completion array 505 is stored in a different computing node than the row segments 504, and is used by a remote processing unit in the different computing node to track the progress of solving row segments 504.

The division of the matrix 510 into column blocks 501 and row blocks 502 results in manageable pieces of data that are distributed to different processing units and to different workgroups executed in the processing units, and for which inter-block dependencies are tracked with low overhead. In one embodiment, the column blocks 501 of the matrix 510 (and corresponding subvectors 503) are distributed among multiple processing units (e.g., GPUs) in a circular order (i.e., in round robin fashion). That is, each of the column block portions 501 is assigned to a next processing unit in the circular sequence until the last processing unit is reached; then, the circular sequence restarts at the beginning and the next column block is assigned to the first processing unit. The column blocks 501 are thus distributed substantially evenly among the available processing units in the system. Each of the processing units performs computations on its respective assigned column block 501. Accordingly, each processing unit calculates values for the factors in the subvector 503 corresponding to its assigned column block 501, according to the forward substitution calculation process.

Figure 5B:
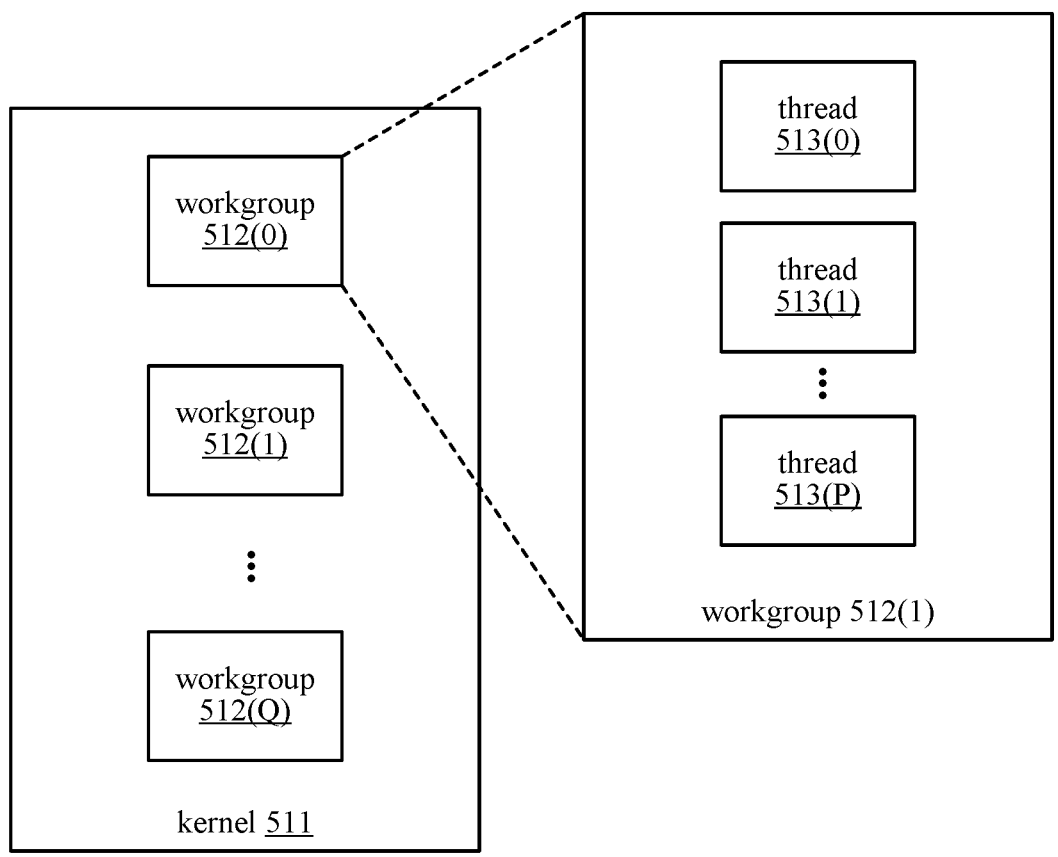
FIG. 5B illustrates the grouping of threads into workgroups in a kernel, according to an embodiment.

FIG. 5B illustrates the grouping of threads into workgroups in a kernel, according to an embodiment. Kernel 511 is launched in one of the processing units (e.g., processing unit 204(0)) to solve a portion (e.g., column block 501(0)) of the matrix 510 that is assigned to the processing unit. The kernel 511 includes Q workgroups 512(0)-512(Q) that are each associated with one or more of the M row blocks 502 (when M Q). In one embodiment, the kernel 511 includes hundreds or thousands of workgroups 512, with at least some of the workgroups 512 executable in parallel with each other. Row blocks 502 are distributed among workgroups according to a circular sequence of the workgroups. For example, each of the row blocks 502 is assigned to a next one of the workgroups 512 in the circular sequence. After each time a row block is assigned to the last workgroup 512(Q), the circular sequence restarts so that the next row block is assigned to workgroup 512(0). In this way, the row blocks 502 are distributed substantially evenly among the workgroups 512 in round robin fashion, and each of the workgroups 512 is associated with one or more of the row blocks 502.

Each of the workgroups 512 includes multiple threads that are executable in parallel in a processing unit, where each thread is executed to solve a row segment in an associated row block by calculating a partial sum (if the row segment does not include a diagonal element of the matrix 510) or a factor x[n] (if the row segment includes a diagonal element) for the row n that includes the row segment. For example, the workgroup 512(0) includes P threads 513(0)-513(P), where each of the P threads solves one or more row segments in an associated row block 502(0). In one embodiment, threads in the same workgroup are executed synchronously with each other under the same clock reference. Threads in different workgroups may be executed using the same clock or different clocks.

Figure 6:
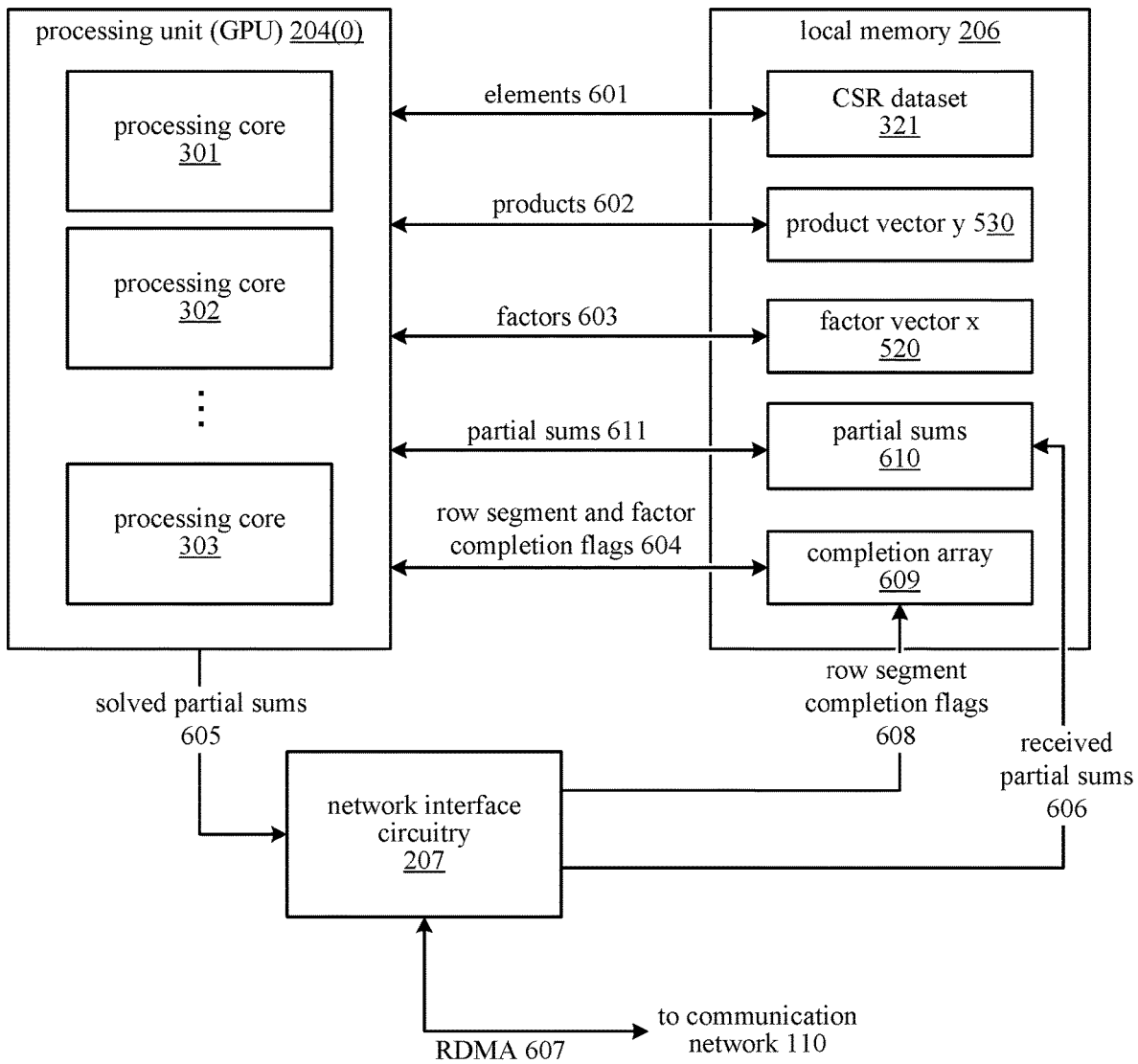
FIG. 6 illustrates components in a computing device for performing a SpTS, according to an embodiment.

FIG. 6 illustrates components in a computing device 101 for performing a SpTS, according to an embodiment. As illustrated in FIG. 6, a processing unit 204(0) is implemented using a GPU having multiple processing cores 301-303. In one embodiment, all of the processing cores 301-303 reside on a single integrated circuit die or in a single device package. The processing unit 204(0) has access to a local memory 206, which is implemented in a memory device from which data can be accessed with low latency (e.g., located in the same computing device as the processing unit 204(0)). The local memory 206 stores a CSR dataset 321 representing a portion (e.g., column block 501(0)) of the matrix 510. The local memory 206 also includes at least the portions of the product vector y 530 and the factor vector x 520 that are used by the processing unit 204(0) to solve the subvector 503(0) of factors x corresponding to the column block 501(0) assigned to the processing unit 204(0). The memory 206 also stores a completion array 609 that includes a factor completion flag (of a factor completion array 506) for each of the factors in the vector x 520, with each completion flag indicating whether its corresponding factor has been solved. The local memory 206 includes a region 610 for storing partial sums calculated from antecedent row segments; accordingly, the completion array 609 also includes row segment completion flags (of a row segment completion array 505) for tracking whether the antecedent row segments being solved in other computing nodes have been solved and their partial sums written to the region 610.

The processing unit 204(0) launches a kernel 511 for executing the set of workgroups 512. Each of the processing cores 301-303 in the processing unit 204(0) executes one or more of the threads in the workgroups 512. Thus, each processing core 301-303 calculates a partial sum or a factor for one or more of the row segments in the column block portion 501(0) assigned to the processing unit 204(0). In order to perform these calculations, the processing cores 301-303 read elements 601, products 602, and antecedent factors 603 from the CSR dataset 321, product vector y 530, and the factor vector x 520, respectively, for the row segment being solved. Each row segment is solved based on the elements 601, products 602, and antecedent factors 603 for the row segment.

If the row segment being solved does not include a diagonal element of the matrix 510, a partial sum is calculated by multiplying each element in the row segment with its corresponding factor (according to the matrix multiplication operation), then summing the resulting terms with any partial sums calculated from antecedent row segments. If the row segment includes a diagonal element of the matrix 510, the factor for the row is solved using elements in the row segment, known factor values, and partial sums from any antecedent row segments, and is solved according to the forward substitution process as previously described with reference to FIG. 4A. In either case, the calculation of the partial sum or factor is not completed until all dependencies for the row segment are met. If the row segment does not include a diagonal element, these dependencies are the factors calculated from previous rows. If the row segment does contain a diagonal element, these dependencies also include the solutions to all of the antecedent row segments. All of the antecedent row segments are solved when their partial sums have been calculated and written to local memory 206, or if the row segment being solved has no dependencies on any antecedent row segments.

Each thread 301-303 proceeds with solving a row segment when its input factors have been solved. In order to determine whether these dependencies have been met, each thread that has such a dependency polls the completion array 609 by executing a spin loop to repeatedly check a factor completion flag 604 for each of the rows that will solve for the preceding factors. When a row is solved, the factor completion flag 604 corresponding to the solved row is asserted. In one embodiment, each workgroup proceeds with its calculations when the factor completion flags are asserted for all of the factors on which the threads in the workgroup depend.

When a factor for a row is calculated, the thread writes the value of the solved factor to the factor vector x, then asserts the corresponding completion flag for the solved factor in the completion array 609 so the factor is available for solving other row segments in the column block. Threads executed in the kernel 511 thus have low latency access to antecedent factors on which they depend, when such factors are calculated by other threads in the same kernel 511, by virtue of having access to the same local memory 206. Dependent threads determine whether their antecedent factors are available by polling the completion flags associated with the antecedent factors.

However, some workgroups are dependent on antecedent factors solved in other computing nodes and on matrix elements stored in other computing nodes. For the row segments in these workgroups, partial sums are calculated in the remote computing nodes (e.g., computing devices 102-103) and received via remote direct memory access (RDMA) requests 607 over the communication network 110. RDMA requests 607 are received by the network interface circuitry 207 of the local computing node 101. RDMA requests 607 allow remote nodes to write their calculated partial sums 606 to region 610 in the local memory 206 without involving the host CPU of the destination local memory 206. Thus, the received partial sums 606 are written to the region 610 from the network interface circuitry 207 in response to the RDMA requests 607. Also in response to receiving the RDMA request 607, the network interface circuitry 207 asserts for each of the received partial sums 606 a row segment completion flag 608 corresponding to the received antecedent factor. The RDMA request 607 includes the solved value of the partial sum itself or some other indication that the antecedent factor is solved.

Solved partial sums 605 that are calculated by threads executed in the processing unit 204(0) are also transmitted to remote computing nodes for use in their calculations. The partial sums 605 are transmitted to the network interface circuitry 207, which then transmits the factors in RDMA requests 607 to remote memory. In one embodiment, the remote memory is located in one or more memory devices that, compared to local memory 206, are physically remote (e.g., located in other computing nodes) and/or are accessed by the processing unit 204(0) through communication network 110 rather than bus 201 and thus have higher access latency than the local memory 206. When received at the remote computing nodes, the partial sums 605 are written to the remote memory regions, and the corresponding row segment completion flags are also asserted in the remote memory.

By updating the partial sums and asserting their corresponding completion flags in a remote computing node, the network interface circuitry 207 resolves dependencies in the remote computing node and thus initiates the solving of dependent row blocks from a second portion (e.g., column block 501(1)) of the sparse triangular matrix 510. In the remote computing nodes, each thread executing in the remote processing units polls the completion flags of the antecedent row segments representing dependencies in their respective row calculations. When the polled completion flags indicate that all of the antecedent partial sums are available (i.e., have been solved and written to the remote memory) for the workgroup, the threads stop polling and start parallel execution of their calculations that depend on the partial sums.

In one embodiment, a workgroup operating on a row segment that does not include a diagonal element waits until it receives partial sums calculated from other row segments in the same row and in lower-indexed column blocks before calculating its own partial sum; however, this approach can cause the row segments to be solved serially. In an alternative embodiment, partial sums for row segments in the same row that do not include diagonal elements are calculated in parallel when all of their antecedent factors are available. When solved, partial sums are added to a global memory region that is accessible to all of the computing nodes. In one embodiment, any partial sums calculated by each workgroup are added atomically (i.e., via a remote atomic write operation) to the global memory region. Alternatively, the global memory region includes an array of sufficient size for storing all of the possible partial sums, along with a row segment completion array for indicating when calculation of each partial sum has been completed. For a row segment that includes a diagonal element, the factor for the row segment is calculated based on the antecedent partial sums when the antecedent partial sums for the row segment are solved and are available from the global memory region.

The kernel 511 executing in the processing unit 204(0) controls both the SpTS computation and the communication of solved partial sums 605 to remote memory locations. Since the processing unit 204(0) performs the communication of solved partial sums 605 during execution of the kernel 511, the overhead cost of terminating the kernel 511 and returning control to a host CPU is avoided. The communication of solved partial sums 605 is performed asynchronously using one-sided communication semantics so that the solved partial sums 605 are updated with finer granularity, compared to approaches in which updates are sent to remote nodes at the end of each kernel.

Figure 7:
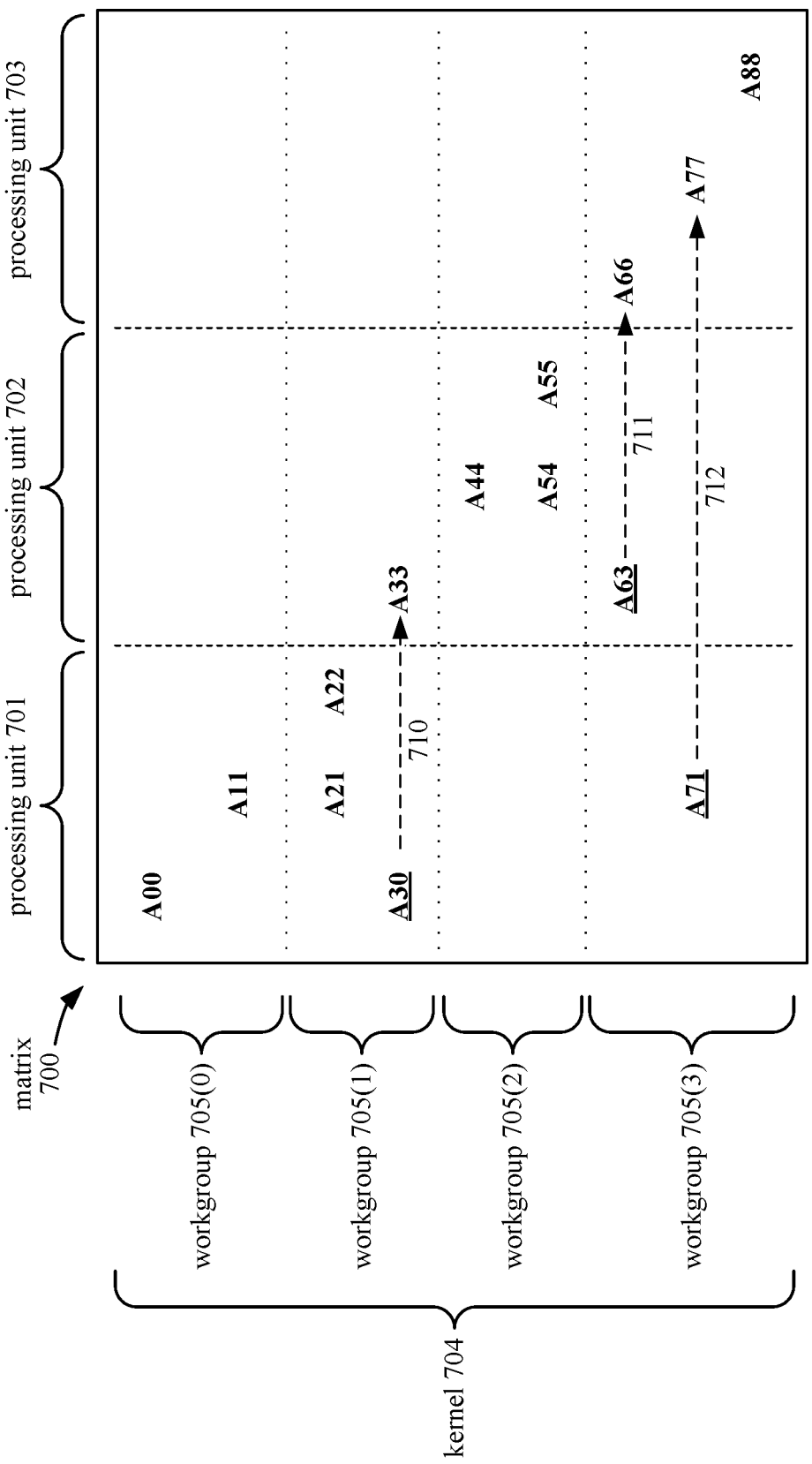
FIG. 7 illustrates the solving of a sparse triangular matrix in multiple processing units, according to an embodiment.

FIG. 7 illustrates the solving of a sparse triangular matrix 700 in multiple processing units 701-703 by dividing the matrix 700 into multiple column block and row block portions, according to an embodiment. The sparse triangular matrix 700 includes multiple elements A00-A88. The reference number for each element indicates the row and column indexes of the element in the matrix; for example, A30 is located in row 3 and column 0 of the matrix.

Each of the processing units 701-703 is assigned a column block including a subset of the columns of matrix 700. Each of the workgroups 705 is assigned a row block including a number of row segments. The processing units 701-703 start their respective kernels 704 at the same time (i.e., in response to the same start indication or signal). In each of the processing units 701-703, each workgroup that does not have dependencies (e.g., workgroups 705(2) and 705(3) in processing unit 702) proceeds to solve its respective row block, with each row segment in the row block being solved by one of the threads in the workgroup. Each row block is solved by, for each row segment in the row block, calculating a partial sum for the row segment or a factor for the row in which the row segment resides.

At least some of the workgroups (e.g., workgroup 705(1) in processing unit 702 and workgroup 705(3) in processing unit 703) exhibit a dependency with one or more of their corresponding workgroups on remote processing units that operate on different segments of the same rows. A workgroup that has a dependency on another workgroup in a remote processing unit waits for the dependencies to be met during the time that workgroups without dependencies proceed with their calculations. For example, in processing unit 702, workgroups 705(2) and 705(3) have no dependencies on other workgroups and proceed with the calculation, while workgroup 705(1) has a dependency on factor x[0] (corresponding to element A41) and therefore waits for workgroup 705(0) in processing unit 701 to calculate the antecedent factor x[0] by solving row 0 and for workgroup 705(1) to subsequently calculate its partial sum by multiplying x[0] with A30. During this waiting period, the processing unit 702 polls the completion flag corresponding to the antecedent row segment that includes element A30 and is used to calculate the partial sum.

Once the partial sum is calculated, the value of the partial sum is written to memory that is local to processing unit 702 via an RDMA request initiated by the processing unit 701. The corresponding row segment completion flag is also asserted. The processing unit 702 determines via polling that the row segment completion flag is asserted, indicating that the partial sum is solved and available to the processing unit 702 in memory. The processing unit 702 subtracts the partial sum from the product y[3] (corresponding to row 3) and divides the result by A33 in order to solve for factor x[3] (corresponding to column 3). The arrows 710, 711, and 712 represent remote write operations via RDMA that are each initiated by a workgroup for writing partial sum to memory in a different computing node.

Figure 8:
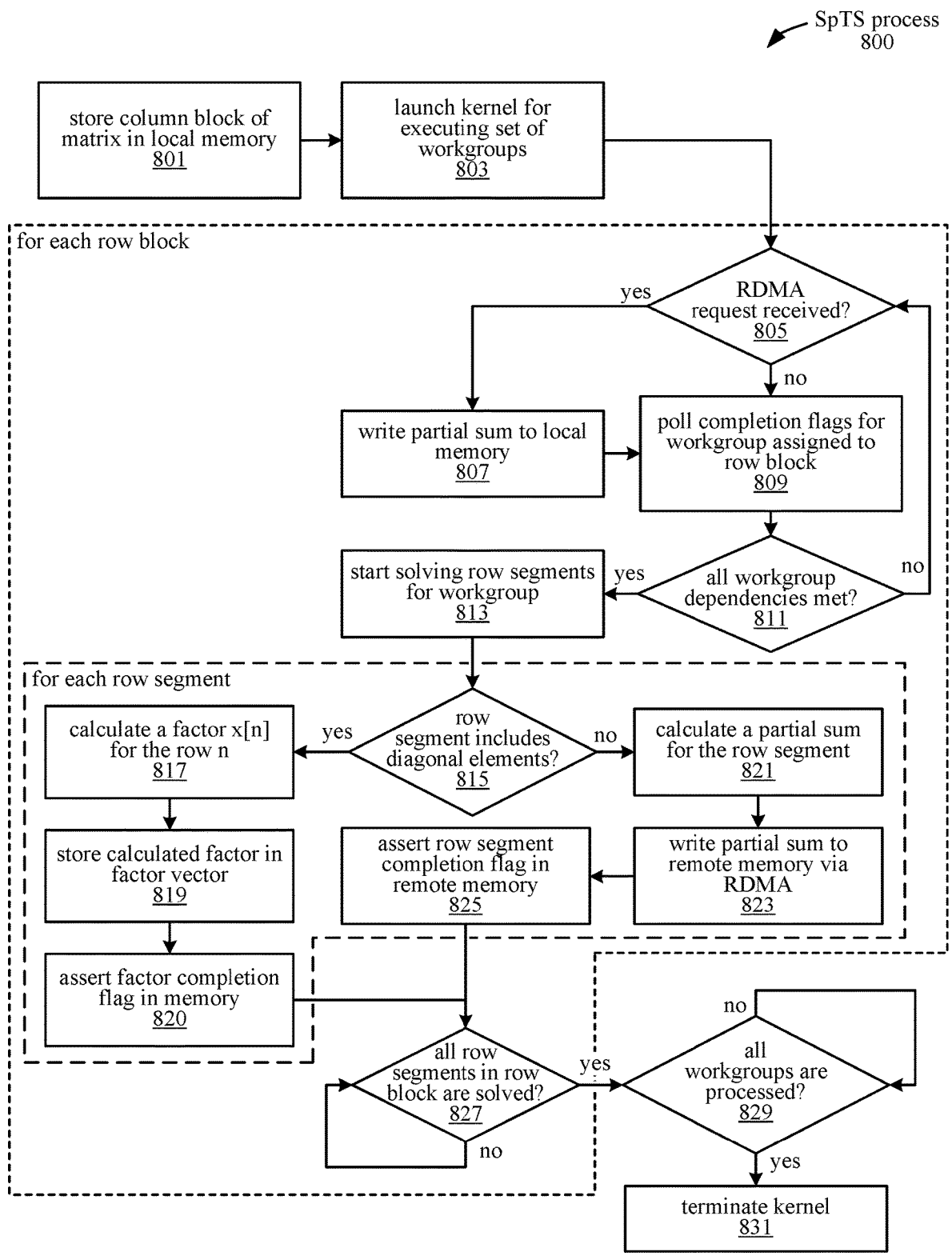
FIG. 8 is a flow diagram illustrating a process for performing a SpTS in a parallel computing system, according to an embodiment.

FIG. 8 illustrates a process for performing a SpTS in a distributed accelerator-based parallel computing system, according to an embodiment. The SpTS process 800 is performed in a computing device such as one of the computing devices 101-103. For solving a sparse triangular matrix divided into multiple column block portions, the SpTS process 800 is performed for each column block of the matrix, where each column block is solved in a different one of the computing devices 101-103. The following description describes processing of column block 501(0) in computing device 101; however, the process 800 is similarly executed for processing other column blocks in other computing devices.

At block 801, the column block 501(0) assigned to the computing device 101 is stored in the local memory 206 of the computing device 101. The matrix elements in the column block 501(0) are stored in a values array of a CSR dataset 321. In a columns array of the CSR dataset 321, a column of the column block 501(0) is identified for each of the elements in the values array. In a row pointers array of the CSR dataset 321, a set of pointers is stored that identifies the elements in each of multiple row segments of the column block 501(0). In one embodiment, the pointers refer to the values array and identify the first element of each row segment.

At block 803, the processing unit 204(0) launches a kernel for executing a set of workgroups, where each workgroup is associated with one of a set of row blocks in the column block 501(0). Blocks 805-827 are executed for each of the workgroups (e.g., workgroup 512(0)) and its corresponding row block (e.g., row block 502(0)).

The computing device 101 supports RDMA requests from remote computing devices (e.g., computing devices 102-103), allowing the remote computing devices to write partial sums for their row segments to the local memory 206. Accordingly, at block 805, if an RDMA request 607 is received at the network interface circuitry 207, then the network interface circuitry 207 writes the partial sum 606 received by the RDMA 607 to the local memory 206, as provided at block 807. From block 807, the process 800 continues at block 809. At block 809, the processing cores 301-303 assigned to execute the threads in workgroup 512(0) for their respective row segments poll the completion flags associated with row segments in remote computing nodes on which they are dependent. In one embodiment, the polling is performed by executing spin loops to repeatedly read the completion flags. At block 805, if an RDMA request has not been received at the network interface circuitry 207, then the process 800 proceeds from block 805 to block 809 without fulfilling any RDMA request.

At block 811, if all of the dependencies for the row segments being solved in the workgroup have not been met, then the process 800 returns to block 805. Blocks 805-811 are repeated until all of the antecedent partial sums are received via RDMA and the dependencies are thus met. At block 811, if all of the dependencies for the row segments being solved in the workgroup have been met, then the process 800 continues at block 813. The processing cores 301-303 determine that the dependencies are met based on some indication that the antecedent row segments have been solved and written to the local memory 206, such as one or more row segment completion flags 608 that are asserted in the local memory 206 in response to solving of the antecedent row segments in a remote processing unit.

At block 813, the workgroup 512(0) starts solving its row segments to calculate, for each row segment, a partial sum for the row segment or a factor for the matrix row in which the row segment resides. Each workgroup in the kernel includes multiple threads that are executable in parallel; workgroup 512(0) includes multiple threads 513. Blocks 815-825 are performed for each of the threads 513 (e.g., thread 513(0)) in the workgroup 512(0) and its associated row segment.

At block 815, if the row segment being solved by the thread 513(0) includes a diagonal element of the sparse triangular matrix, then the process 800 continues at block 817. At block 817, the thread calculates a factor x[n] for the matrix row n in which the row segment resides. The factor x[n] is calculated by forward substitution based on elements in the row segment (including the diagonal element), a product y[n] for the row, and partial sums, if any, calculated from antecedent row blocks. At block 819, the calculated factor x[n] is stored in the factor vector x 520 in the local memory 206. At block 820, the factor completion flag corresponding to the calculated factor x[n] is asserted in the memory of any computing nodes depending on the factor x[n], which can include the local memory 206 and/or remote memory in another computing node.

At block 815, if the row segment being solved by the thread 513(0) excludes all diagonal elements of the sparse triangular matrix, then the process 800 continues at block 817. In one embodiment, if a given row segment includes one or more nonzero elements and does not include any diagonal element of the matrix, then there exists a row segment in another column block of the matrix that is dependent on the given row segment. Accordingly, at block 817, a partial sum for the given row segment is calculated to be used for solving the dependent row segments in other column blocks. The partial sum is calculated by one of the parallel threads 513 in the workgroup 512(0) based on the one or more nonzero elements in the row segment and their respective factors from the factor vector x 520. Each of the nonzero elements is multiplied with its respective factor according to the matrix multiplication process, and the resulting terms are summed to calculate the partial sum for the row segment. At block 823, the calculated partial sum 605 is asynchronously written to one or more remote memory regions in one or more remote computing devices using the RDMA mechanism.

At block 825, the row segment completion flag associated with the row segment is asserted in the remote memory, indicating to the remote processing unit that the partial sum of the row segment is available for solving of any dependent row segments from a different column block (e.g., column block 501(1)) in the remote processing unit. The remote processing unit polls the row segment completion flag (e.g., by executing a spin loop routine to monitor the flag) to determine whether the dependency is met. When all of the dependencies in the remote workgroup are met, assertion of the row segment completion flag for the last remaining dependency initiates the calculations for solving of row segments in the row block assigned to the remote workgroup.

By the operation of blocks 815-825 for each of the row segments in the row block corresponding to the workgroup 512(0), the row segments are thus solved in parallel threads executed in processing cores 301-303. Row segments that have diagonal elements are solved by calculating x factors, while row segments that exclude any diagonal elements are solved by calculating their partial sums. From block 820 or 825, the process 800 continues at block 827. At block 827, the process 800 waits until all of the row segments for the workgroup 512(0) are solved. The workgroup 512(0) is completed when, at block 827, all of the row segments are solved and their associated threads completed. From block 827, the process 800 continues at block 829.

Blocks 805-827 are performed for each of the workgroups 512 in the kernel 511. When blocks 805-827 have been completed for all of the workgroups 512, the kernel 511 is terminated. Thus, the computing device 101 executes the single persistent kernel 511 for the duration of the SpTS process 800. Both the computation and communication tasks associated with solving the column block are completed prior to terminating the single kernel 511; therefore, overhead is avoided that would have been incurred from exiting the kernel, returning control to a host CPU to perform the communication, and starting a new kernel to continue the computations.

A method includes storing a first portion of a sparse triangular matrix in a local memory and launching a kernel for executing a set of workgroups. The first portion includes a plurality of row blocks, and each workgroup in the set of workgroups is associated with one of the plurality of row blocks. The method also includes, for each workgroup in the set of workgroups, solving the row block by, for each row segment of a first subset of row segments in the row block, calculating a partial sum for the row segment based on one or more matrix elements in the row segment, and writing the partial sum to a remote memory of a first remote processing unit prior to terminating the kernel.

In the method, storing the first portion of the sparse triangular matrix further includes storing elements of the first portion in a values array of a CSR dataset, in a columns array of the CSR dataset, identifying a column of the first portion for each of the elements stored in the values array, and in a row pointers array of the CSR dataset, identifying the elements in each of a plurality of row segments of the first portion.

In the method, for each workgroup of the set of workgroups, the workgroup includes a plurality of threads executable in parallel, and for each row segment in the first subset of row segments, the partial sum for the row segment is calculated by one of the parallel threads.

In the method, for each row segment of the first subset of row segments, the row segment excludes all diagonal elements of the sparse triangular matrix. Writing the partial sum to the remote memory includes asynchronously transmitting the partial sum to the remote memory via a remote direct memory access (RDMA) and, in the first remote processing unit, initiating a calculation for a row block of a second portion of the sparse triangular matrix after writing the partial sum to the remote memory.

The method further includes, for each row segment of the first subset of row segments, where the row segment excludes all diagonal elements of the sparse triangular matrix, asserting a completion flag after writing the partial sum to the remote memory, where the completion flag is associated with the row segment.

In the method, for each workgroup in the set of workgroups, the partial sums for the row block corresponding to the workgroup are calculated in parallel in a plurality of processing cores coupled with the local memory.

The method further includes, for each row segment of a second subset of row segments in the row block, determining that all antecedent row segments for the row segment are solved by executing a spin loop to monitor a completion flag for each of the antecedent row segments, where the row segment includes a diagonal element of the sparse triangular matrix. The method also includes calculating a factor for the row segment based on the diagonal element, storing the calculated factor in a factor vector in the local memory, and asserting a factor completion flag associated with the factor.

The method further includes, for each row segment of the first subset of row segments, where the row segment excludes all diagonal elements of the sparse triangular matrix, and for each antecedent factor of a set of antecedent factors of the row segment, executing a spin loop to monitor a completion flag associated with the antecedent factor. The method also includes calculating a partial sum for the row segment when all completion flags associated with the set of antecedent factors are asserted.

The method further includes, for each workgroup in the set of workgroups, in response to an indication that all antecedent row segments for the row block associated with the workgroup are solved, for at least one row segment of the first subset of row segments, add the partial sum for the row segment to one or more partial sums calculated from one or more of the antecedent row segments.

A computing device includes a local memory to store a first portion of a sparse triangular matrix, where the first portion includes a plurality of row blocks. The computing device also includes a processing unit coupled with the local memory to launch a kernel for executing a set of workgroups, where each workgroup in the set of workgroups is associated with one of the plurality of row blocks. The processing unit, for each workgroup in the set of workgroups, solves the row block by, for each row segment of a first subset of row segments in the row block, calculating a partial sum for the row segment based on one or more matrix elements in the row segment, and writing the partial sum to a remote memory of a first remote processing unit prior to terminating the kernel.

In the computing device, for each workgroup of the set of workgroups, the workgroup includes a plurality of threads executable in parallel, the processing unit includes a plurality of processing cores each to execute one of the plurality of threads, and for each row segment in the first subset of row segments, the partial sum for the row segment is calculated by one of the parallel threads.

The computing device further includes network interface circuitry to, for each row segment of the first subset of row segments, write the partial sum to the remote memory by transmitting the partial sum to the remote memory via a remote direct memory access (RDMA) request, and in a first remote processing unit, initiate a calculation for a row block of a second portion of the sparse triangular matrix after writing the partial sum to the remote memory.

The computing device further includes network interface circuitry to assert a completion flag corresponding to one or more of the antecedent row segments in response to receiving an RDMA request from a second remote processing unit indicating that the one or more antecedent row segments are solved, where the local memory stores the completion flag.

In the computing device, the processing unit, for each row segment of a second subset of row segments in the row block, determines that all antecedent row segments for the row segment are solved by executing a spin loop to monitor a completion flag for each of the antecedent row segments, where the row segment includes a diagonal element of the sparse triangular matrix, and calculates a factor for the row segment based on the diagonal element. The local memory stores the calculated factor in a factor vector.

A computing system includes a memory system to store portions of a sparse triangular matrix, and a set of processing units coupled with the memory system. For each processing unit in the set of processing units, the processing unit is associated with one of the portions and launches a kernel for executing a set of workgroups in the processing unit, where each workgroup in the set of workgroups is associated with a row block in the portion associated with the processing unit, and for each workgroup in the set of workgroups, solve the row block. The row block is solved by, for each row segment of a first subset of row segments in the row block, calculating a partial sum for the row segment based on one or more matrix elements in the row segment, and writing the partial sum to a remote memory of a first remote processing unit prior to terminating the kernel.

The computing system further includes a communication network and a plurality of computing nodes. Each of the plurality of computing nodes is coupled with the communication network, and each of the plurality of computing nodes includes one of the set of processing units. Each processing unit in the set of processing units includes a graphics processing unit (GPU) on a separate integrated circuit die from other processing units in the set of processing units.

In the computing system, for each workgroup of the set of workgroups, the workgroup includes a plurality of threads executable in parallel. For each row segment in the row block corresponding to the workgroup, the partial sum for the row segment is calculated by one of the plurality of threads. The processing unit executing the workgroup includes a plurality of processing cores each executing one of the plurality of threads.

In the computing system, for each processing unit in the set of processing units, the processing unit includes a plurality of processing cores on a single integrated circuit die.

In the computing system, the memory system includes a plurality of memory regions each residing in one of a plurality of computing nodes coupled by a communication network. For each processing unit in the set of processing units, writing the partial sum to the remote memory further includes transmitting the factor in a RDMA request via the communication network to one of the plurality of computing nodes.

In the computing system, for one or more rows of the sparse triangular matrix, each of the one or more rows includes a first subset of row segments each excluding all diagonal elements of the sparse triangular matrix, and a second row segment that includes a diagonal element of the sparse triangular matrix. The set of processing units in the computing system calculates a set of partial sums in parallel for the first subset of row segments, and calculates a factor for the second row segment based on the set of partial sums.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing device 101 and/or portions thereof carried on the computer-readable storage medium may be a database or other data structure which can be read by a program and used, directly or indirectly, to fabricate the hardware including the computing device 101. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing device 101. The netlist may then be placed and routed to produce a data set describing geometric shapes to be applied to masks. The masks may then be used in various semiconductor fabrication steps to produce a semiconductor circuit or circuits corresponding to the computing device 101. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
   storing a first portion of a sparse triangular matrix in a local memory, wherein the first portion comprises a plurality of row blocks;
   launching a kernel for executing a set of workgroups, wherein each workgroup in the set of workgroups is associated with one of the plurality of row blocks; and
   for each workgroup in the set of workgroups,
      solving the row block by, for each row segment of a first subset of row segments in the row block,
         calculating a partial sum for the row segment based on one or more matrix elements in the row segment, and
         writing the partial sum to a remote memory of a first remote processing unit prior to terminating the kernel.

2. The method of claim 1, wherein storing the first portion of the sparse triangular matrix further comprises:
   storing elements of the first portion in a values array of a compressed sparse row (CSR) dataset;
   in a columns array of the CSR dataset, identifying a column of the first portion for each of the elements stored in the values array; and
   in a row pointers array of the CSR dataset, identifying the elements in each of a plurality of row segments of the first portion.

3. The method of claim 1, wherein:
   for each workgroup of the set of workgroups,
      the workgroup comprises a plurality of threads executable in parallel, and
      for each row segment in the first subset of row segments, the partial sum for the row segment is calculated by one of the parallel threads.

4. The method of claim 1, wherein, for each row segment of the first subset of row segments:
   the row segment excludes all diagonal elements of the sparse triangular matrix,
   writing the partial sum to the remote memory comprises asynchronously transmitting the partial sum to the remote memory via a remote direct memory access; and
   in the first remote processing unit, initiating a calculation for a row block of a second portion of the sparse triangular matrix after writing the partial sum to the remote memory.

5. The method of claim 1, further comprising:
   for each row segment of the first subset of row segments, wherein the row segment excludes all diagonal elements of the sparse triangular matrix, asserting a completion flag after writing the partial sum to the remote memory, wherein the completion flag is associated with the row segment.

6. The method of claim 1, wherein:
   for each workgroup in the set of workgroups, the partial sums for the row block corresponding to the workgroup are calculated in parallel in a plurality of processing cores coupled with the local memory.

7. The method of claim 1, further comprising, for each row segment of a second subset of row segments in the row block:
   determining that all antecedent row segments for the row segment are solved by executing a spin loop to monitor a completion flag for each of the antecedent row segments, wherein the row segment includes a diagonal element of the sparse triangular matrix;
   calculating a factor for the row segment based on the diagonal element;
   storing the calculated factor in a factor vector in the local memory; and
   asserting a factor completion flag associated with the factor.

8. The method of claim 1, further comprising, for each row segment of the first subset of row segments, wherein the row segment excludes all diagonal elements of the sparse triangular matrix:
   for each antecedent factor of a set of antecedent factors of the row segment, executing a spin loop to monitor a completion flag associated with the antecedent factor; and
   calculating a partial sum for the row segment when all completion flags associated with the set of antecedent factors are asserted.

9. The method of claim 1, further comprising, for each workgroup in the set of workgroups:
   in response to an indication that all antecedent row segments for the row block associated with the workgroup are solved, for at least one row segment of the first subset of row segments, add the partial sum for the row segment to one or more partial sums calculated from one or more of the antecedent row segments.

10. A computing device, comprising:
    a local memory configured to store a first portion of a sparse triangular matrix, wherein the first portion comprises a plurality of row blocks;
    a processing unit coupled with the local memory and configured to:
    launch a kernel for executing a set of workgroups, wherein each workgroup in the set of workgroups is associated with one of the plurality of row blocks; and
    for each workgroup in the set of workgroups,
       solve the row block by, for each row segment of a first subset of row segments in the row block,
          calculating a partial sum for the row segment based on one or more matrix elements in the row segment, and
          writing the partial sum to a remote memory of a first remote processing unit prior to terminating the kernel.

11. The computing device of claim 10, wherein:
    for each workgroup of the set of workgroups,
       the workgroup comprises a plurality of threads executable in parallel;
       the processing unit comprises a plurality of processing cores each configured to execute one of the plurality of threads; and
       for each row segment in the first subset of row segments, the partial sum for the row segment is calculated by one of the parallel threads.

12. The computing device of claim 10, further comprising network interface circuitry configured to, for each row segment of the first subset of row segments:
  write the partial sum to the remote memory by transmitting the partial sum to the remote memory via a remote direct memory access request; and
  in a first remote processing unit, initiate a calculation for a row block of a second portion of the sparse triangular matrix after writing the partial sum to the remote memory.

13. The computing device of claim 10, further comprising network interface circuitry configured to:
  assert a completion flag corresponding to one or more of the antecedent row segments in response to receiving a remote direct memory access request from a second remote processing unit indicating that the one or more antecedent row segments are solved, wherein the local memory is further configured to store the completion flag.

14. The computing device of claim 10, wherein the processing unit is further configured to, for each row segment of a second subset of row segments in the row block:
  determine that all antecedent row segments for the row segment are solved by executing a spin loop to monitor a completion flag for each of the antecedent row segments, wherein the row segment includes a diagonal element of the sparse triangular matrix;
  calculate a factor for the row segment based on the diagonal element; and
  the local memory is further configured to store the calculated factor in a factor vector.

15. A computing system, comprising:
  a memory system configured to store portions of a sparse triangular matrix;
  a set of processing units coupled with the memory system, wherein for each processing unit in the set of processing units, the processing unit is associated with a one of the portions and is configured to:
  launch a kernel for executing a set of workgroups in the processing unit, wherein each workgroup in the set of workgroups is associated with a row block in the portion associated with the processing unit; and
  for each workgroup in the set of workgroups,
    solve the row block by, for each row segment of a first subset of row segments in the row block,
    calculating a partial sum for the row segment based on one or more matrix elements in the row segment, and
    writing the partial sum to a remote memory of a first remote processing unit prior to terminating the kernel.

16. The computing system of claim 15, further comprising:
  a communication network; and
  a plurality of computing nodes, wherein:
    each of the plurality of computing nodes is coupled with the communication network; and
    each of the plurality of computing nodes comprises one of the set of processing units, and
    each processing unit in the set of processing units comprises a graphics processing unit (GPU) on a separate integrated circuit die from other processing units in the set of processing units.

17. The computing system of claim 15, wherein:
  for each workgroup of the set of workgroups,
    the workgroup comprises a plurality of threads executable in parallel, and
    for each row segment in the row block corresponding to the workgroup, the partial sum for the row segment is calculated by one of the plurality of threads; and
  the processing unit executing the workgroup comprises a plurality of processing cores each configured to execute one of the plurality of threads.

18. The computing system of claim 15, wherein:
  for each processing unit in the set of processing units, the processing unit comprises a plurality of processing cores on a single integrated circuit die.

19. The computing system of claim 15, wherein:
  the memory system comprises a plurality of memory regions each residing in one of a plurality of computing nodes coupled by a communication network; and
  for each processing unit in the set of processing units, writing the partial sum to the remote memory further comprises transmitting the factor in a remote direct memory access request via the communication network to one of the plurality of computing nodes.

20. The computing system of claim 15, wherein the set of processing units is further configured to:
  for one or more rows of the sparse triangular matrix, wherein each of the one or more rows includes a first subset of row segments each excluding all diagonal elements of the sparse triangular matrix, and a second row segment that includes a diagonal element of the sparse triangular matrix,
    calculate a set of partial sums in parallel for the first subset of row segments; and
    calculate a factor for the second row segment based on the set of partial sums.

* * * * *